United States Patent
Tako et al.

(10) Patent No.: US 9,440,702 B2
(45) Date of Patent: Sep. 13, 2016

(54) VEHICLE BODY FRONT STRUCTURE OF SADDLE-TYPE VEHICLE

(71) Applicant: HONDA MOTOR CO., LTD., Tokyo (JP)

(72) Inventors: Kenji Tako, Wako (JP); Hirotsugu Ueno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 161 days.

(21) Appl. No.: 14/063,306

(22) Filed: Oct. 25, 2013

(65) Prior Publication Data

US 2014/0152045 A1    Jun. 5, 2014

(30) Foreign Application Priority Data

Nov. 30, 2012  (JP) .................. 2012-262431

(51) Int. Cl.
| B62J 17/04 | (2006.01) |
| B62K 19/40 | (2006.01) |
| B62J 6/02  | (2006.01) |
| B62J 17/02 | (2006.01) |
| B62J 29/00 | (2006.01) |

(52) U.S. Cl.
CPC .................. *B62K 19/40* (2013.01); *B62J 6/02* (2013.01); *B62J 17/02* (2013.01); *B62J 29/00* (2013.01)

(58) Field of Classification Search
CPC ....................................................... B62J 17/04

USPC ...................... 296/78.1, 84.1, 180.1; 180/903
See application file for complete search history.

(56) References Cited

U.S. PATENT DOCUMENTS

| 4,911,494 A * | 3/1990 | Imai .......................... B62J 17/00 |
|  |  | 296/180.1 |
| 7,510,229 B2 | 3/2009 | Katagiri et al. |
| 2003/0062740 A1* | 4/2003 | Takemura ................ B62J 17/04 |
|  |  | 296/78.1 |
| 2008/0169134 A1 | 7/2008 | Tomolillo et al. |

FOREIGN PATENT DOCUMENTS

| EP | 0 972 680 A2 | 1/2000 |
| EP | 1 291 274 A2 | 3/2003 |
| JP | 4684826 B2   | 5/2011 |

* cited by examiner

*Primary Examiner* — H Gutman

(74) *Attorney, Agent, or Firm* — Birch, Stewart, Kolasch & Birch, LLP

(57) ABSTRACT

A vehicle body front structure of a saddle-type vehicle includes a headlight and a front cowl with rearview mirrors being attached on the left and right sides of the upper part thereof. A lens surface of the headlight and the upper part of the front cowl each have a surface that is inclined so as to extend upwardly and rearwardly to form a front cowl surface continuously covering the vehicle body front surface. A step part protruding more in a forward direction than the lens surface is made at the connection part between the front cowl and an upper edge of the lens surface of the headlight. This step part extends outwardly in the vehicle width direction to the base parts of the rearview mirrors along the upper edge of the lens surface with mirror-side overhang surfaces continuously leading to the step part.

17 Claims, 14 Drawing Sheets

VEHICLE BODY FRONT STRUCTURE OF SADDLE-TYPE VEHICLE

CROSS-REFERENCE TO RELATED APPLICATIONS

The present application claims priority under 35 USC 119 to Japanese Patent Application No. 2012-262431 filed Nov. 30, 2012 the entire contents of which are hereby incorporated by reference.

BACKGROUND OF THE INVENTION

1. Field of the Invention

The present invention relates to a vehicle body front structure of a saddle-type vehicle.

2. Description of Background Art

A saddle-type vehicle is known wherein an air guiding part that is long in the front-rear direction is provided on the top surface of a front cowl so that a flow of air may flow to below handlebars and above rearview mirrors. See, for example, Japanese Patent No. 4684826. In the configuration of Japanese Patent No. 4684826, a flow of air impinging on the upper body of a rider can be reduced and the resistance of the air pressure to the front cowl can also be reduced.

However, in the above-described conventional saddle-type vehicle, because much of the flow of air flows to the wind guiding part, raindrops hitting on the front surface of the front cowl gather to the wind guiding part and it will be possible that the raindrops splash on the arms of the rider. Furthermore, there is a problem that the vehicle becomes more susceptible to a crosswind if wind is made to flow over a long distance along the surface of the front cowl.

SUMMARY AND OBJECTS OF THE INVENTION

The present invention is devised in view of the above-described circumstances and an object of an embodiment of the present invention thereof is to allow suppression of splashes of raindrops on a front cowl on a rider and reduction in the susceptibility to a crosswind in the vehicle body front structure of a saddle-type vehicle.

To achieve the above-described object, an embodiment of the present invention provides a vehicle body front structure of a saddle-type vehicle including a headlight (49) in a front surface and a front cowl (40) to which rearview mirrors (47) are attached on left and right sides of an upper part of the front cowl (40). A lens surface (63) of the headlight (49) and the upper part of the front cowl (40) each have a surface that is so inclined as to extend upwardly and rearwardly and form a front cowl surface (86) continuously covering a vehicle body front surface in combination. The vehicle body front structure is characterized in the following configuration. A step part (54) protruding more forward than the lens surface (63) is made at a connection part between the front cowl (40) and an upper edge (66) of the lens surface (63) of the headlight (49). The step part (54) extends outwardly in the vehicle width direction to base parts of the rearview mirrors (47) along the upper edge (66) of the lens surface (63). Inclined surfaces (80b) that are continuously leading to the step part (54) are made in the rearview mirrors (47).

According to an embodiment of the present invention, raindrops hitting on the lower side of the headlight flow to the ends of the left and right rearview mirrors along the step part of the front cowl and the inclined surfaces of the rearview mirrors. Thus, splashes of the raindrops on the rider can be suppressed. Furthermore, part of a flow of air flowing along the front cowl separates at the step part of the front cowl. This avoids the situation in which a flow of air flows along the surface of the front cowl over a long distance and thus can suppress the influence of a crosswind on the vehicle.

Furthermore, according to an embodiment of the present invention, the upper edge (66) of the headlight (49) is low at the center and rises obliquely upwardly toward lateral sides.

According to an embodiment of the present invention, raindrops flow to the left and right rearview mirrors more smoothly. This can suppress splashes of the raindrops on the rider.

In addition, according to an embodiment of the present invention, the rearview mirrors (47) have monolithic shapes that are smoothly continuous from the front cowl (40) to bodies (77) of the rearview mirrors (47), and the angle of mirror surfaces (76) is allowed to be independently adjusted.

According to an embodiment of the present invention, it is possible to prevent the situation in which the seam between the front cowl and the body of the rearview mirror hinders the flow of raindrops and the raindrops smoothly flow to the rearview mirrors. This can suppress splashes of the raindrops on the rider.

Moreover, according to an embodiment of the present invention, front cowl (40) has an inclination change point (51b) at which inflection of the shape of a top surface toward the horizontal plane from a substantially vertical front end surface (51a) is made in a side view. The front cowl (40) has side inclination change points (53c) from which the step part (54) extends with a change in orientation to lateral directions from side edge parts (53b) of the front end surface (51a) in front view. The inclination change point (51b) and the side inclination change points (53c) are set at positions substantially corresponding with each other in a side view or the side inclination change points (53c) are set at positions more to the rear than the inclination change point (51b) in a side view.

According to an embodiment of the present invention, on the side of the inclination change point of the front end surface, raindrops can be made to efficiently flow rearwardly. On the side of the side inclination change point, raindrops come to horizontally flow to come to readily flow rearwardly and then laterally flow along the step part. Thus, the raindrops can be made to smoothly flow and splashes of the raindrops on the rider can be suppressed.

Furthermore, according to an embodiment of the present invention, the inclined surfaces (80b) are lower surfaces of the rearview mirrors (47) and have shapes that always extend obliquely rearwardly from parts attached to the front cowl (40) to lateral end parts in a plan view.

According to an embodiment of the present invention, raindrops can be made to smoothly flow obliquely rearwardly from the front cowl. This can suppress splashes of the raindrops on the rider.

In addition, according to an embodiment of the present invention, blinkers (79) are provided monolithically with the bodies (77) of the rearview mirrors (47) and lenses (85) of the blinkers (79) are disposed in the inclined surfaces (80b) as the lower surfaces of the rearview mirrors (47).

According to an embodiment of the present invention, it is possible to prevent light of the blinker from directly reaching the eyes of the rider.

Moreover, according to an embodiment of the present invention, the headlight (49) has lamps (57) that are disposed so as to be separated into left and right sides and lens surface (63) covering the lamps (57). A center part of the headlight (49) between the lamps (57) on the left and right sides is formed so as to be vertically narrower than parts where the lamps (57) are disposed, and only the lens surface (63) is laterally continuous.

According to an embodiment of the present invention, it is hard for heat by the lamps to accumulate at the center part of the headlight, which can prevent the headlight from being affected by the heat. Furthermore, the step part can be easily formed at the part of the front cowl near the upper end of the center of the lens surface.

In the vehicle body front structure of a saddle-type vehicle according to an embodiment of the present invention, raindrops hitting on the lower side of the headlight flow to the ends of the left and right rearview mirrors along the step part of the front cowl and the inclined surfaces of the rearview mirrors. Thus, splashes of the raindrops on the rider can be suppressed. Furthermore, part of a flow of air flowing along the front cowl separates at the step part of the front cowl. This avoids the situation in which a flow of air flows along the surface of the front cowl over a long distance and thus can suppress the influence of a crosswind on the vehicle.

Furthermore, raindrops flow to the left and right rearview mirrors more smoothly. This can suppress splashes of the raindrops on the rider.

In addition, it is possible to prevent the situation in which the seam between the front cowl and the body of the rearview mirror hinders the flow of raindrops and the raindrops smoothly flow to the rearview mirrors. This can suppress splashes of the raindrops on the rider.

Moreover, on the side of the inclination change point of the front end surface, raindrops can be made to efficiently flow rearwardly. On the side of the side inclination change point, raindrops come to horizontally flow to come to readily flow to the rear and then laterally flow along the step part. Thus, the raindrops can be made to smoothly flow and splashes of the raindrops on the rider can be suppressed.

Furthermore, raindrops can be made to smoothly flow obliquely rearwardly from the front cowl. This can suppress splashes of the raindrops on the rider.

In addition, it is possible to prevent light from the blinker from directly reaching the eyes of the rider.

Moreover, it is hard for heat by the lamps to accumulate at the center part of the headlight, which can prevent the headlight from being affected by the heat. Furthermore, the step part can be easily formed at the part of the front cowl near the upper end of the center of the lens surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A motorcycle having a vehicle body front structure according to an embodiment of the present invention will be described below with reference to the drawings. In the description, described directions such as front, rear, left, right, upward, and downward directions are the same as the directions with respect to the vehicle body unless otherwise specified. Furthermore, in the respective drawings, symbol FR indicates the front side of the vehicle body. Symbol UP indicates the upper side of the vehicle body and symbol LE indicates the left side of the vehicle body.

Figure 1:
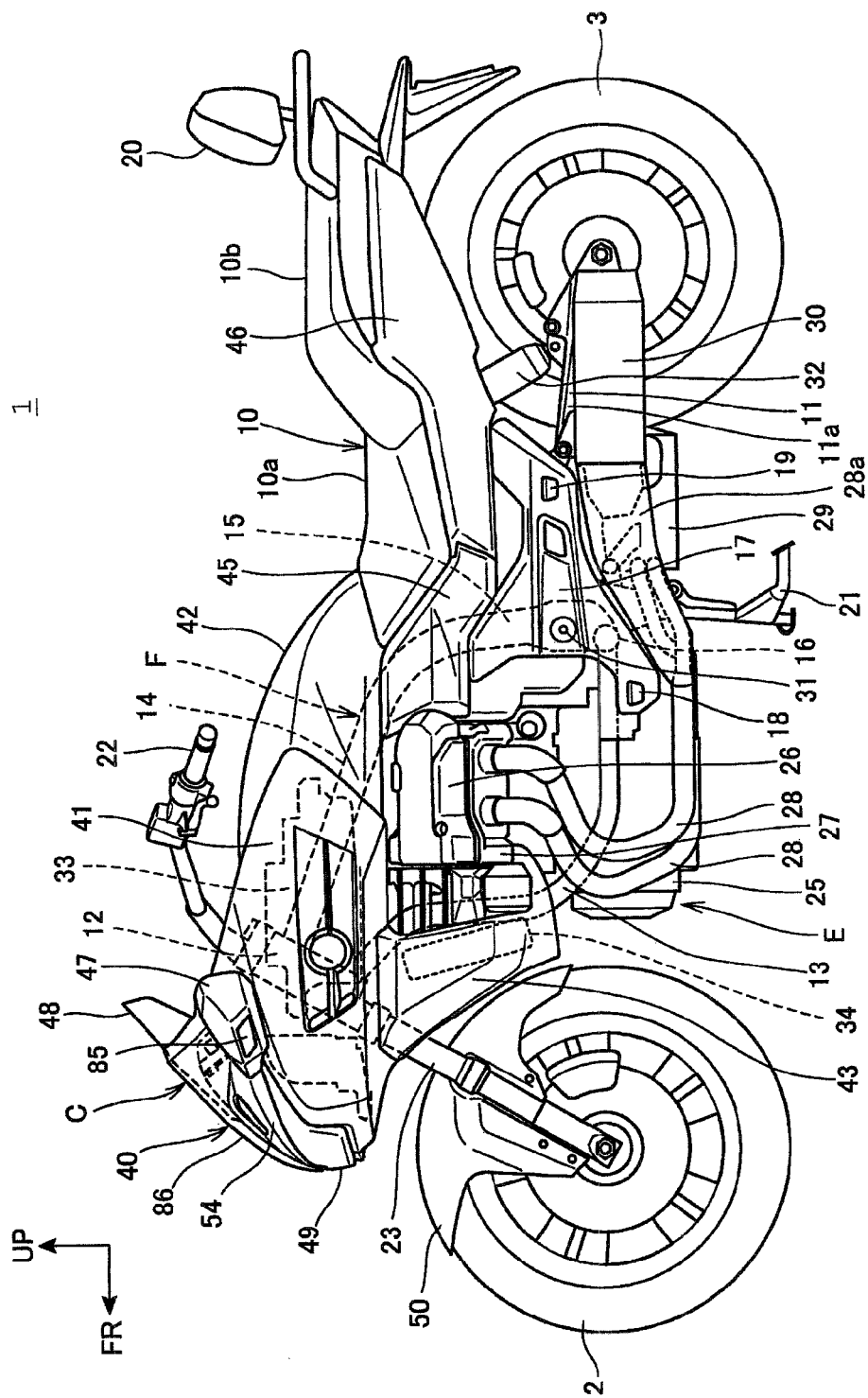
FIG. 1 is a left side view of a motorcycle according to an embodiment of the present invention.

FIG. 1 is a left side view of the motorcycle according to the embodiment of the present invention.

As shown in FIG. 1, a motorcycle 1 is a saddle-type vehicle on which a rider sits on a seat 10 in a straddling manner. The motorcycle 1 includes a front wheel 2 on the front side of a vehicle body frame F and a rear wheel 3 serving as a drive wheel that is pivotally supported by a swing arm 11 disposed at the vehicle rear part. An engine E is supported by the vehicle body frame F on the front side of the seat 10. Part of the vehicle body frame F is covered by a vehicle body cover C made of resin.

The vehicle body frame F is formed by joining a plurality of metal pipes and plate materials by welding or the like. The vehicle body frame F has the following components a head pipe 12 provided at the front part; a pair of left and right down-frames 13 that extend downwardly from the rear part of the head pipe 12 and bend on the rear side of the front wheel 2 to extend rearwardly; a pair of left and right main frames 14 extending rearwardly and downwardly from the rear part of the head pipe 12; a pair of left and right center frames 15 that extend downwardly from the rear ends of the main frames 14 and are joined to the rear ends of the down-frames 13; and a pair of left and right seat frames (not shown) extending from the center frames 15 to the vehicle rear part. Furthermore, the vehicle body frame F has plural cross members to join the left and right components of the vehicle body frame F in the vehicle width direction. For example, a cross pipe 16 is provided between the lower parts of the left and right center frames 15.

To the outer surface of each center frame 15, a plate-shaped step stay 17 that covers the center frame 15 and extends rearward is attached. A step 18 on which the rider places his or her foot is provided at the lower end of the front part of the step stay 17. A tandem step 19 on which a fellow passenger places his or her foot is provided at the rear part of the step stay 17.

The seat 10 is supported by the above-described seat frames and extends rearwardly. The seat 10 is obtained by monolithically forming a front seat 10*a* on which the rider sits and a pillion seat 10*b* formed to the rear of the front seat 10*a* with a larger height. A backrest 20 is provided rearwardly of the pillion seat 10*b*.

A main stand 21 is provided below the center frames 15.

Figure 2:
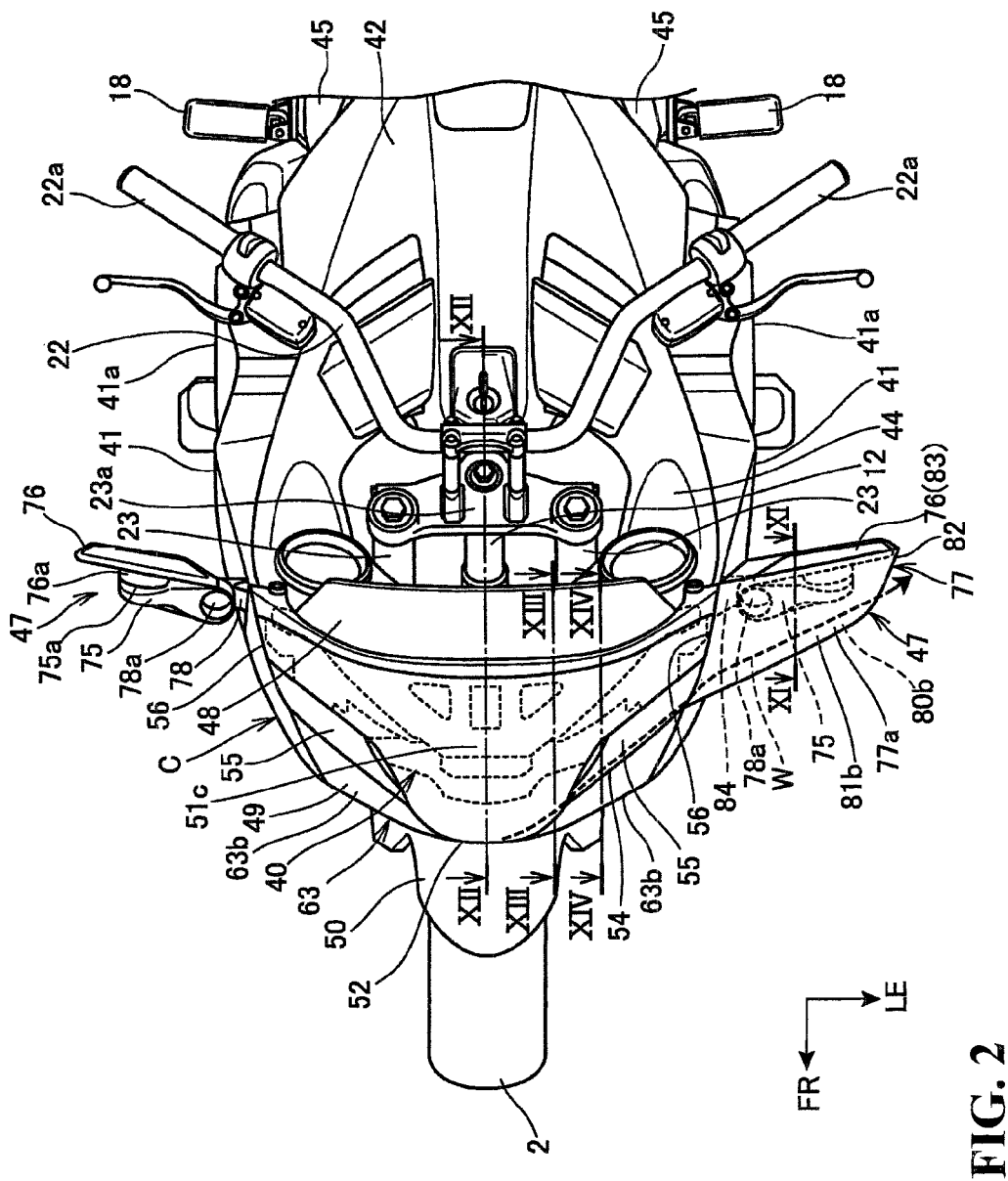
FIG. 2 is a plan view of a vehicle body front part as viewed from above.

A steering system to steer the front wheel 2 has the following components a steering shaft 9 (FIG. 12) pivotally supported by the head pipe 12 in such a manner as to be freely rotatable; a bar handle 22 joined to the upper part of the steering shaft 9; and a pair of left and right front forks 23 joined to the steering shaft 9 with the intermediary of a pair of upper and lower bridges 23*a* (FIG. 2). The front wheel 2 is pivotally supported by the lower ends of the left and right front forks 23 and is steered by operation with the bar handle 22.

The engine E is a so-called longitudinal engine in which a crankshaft (not shown) is provided so as to extend along the front-rear direction of the vehicle. More specifically, the engine E is a V-type, four-cylinder, four-stroke engine and has a crankcase 25 in which the crankshaft is provided with one bank 26 being configured by two cylinders obliquely extending from the upper part of the crankcase 25 toward the upper left side of the vehicle, and the other bank (not shown) configured by two cylinders obliquely extending from the upper part of the crankcase 25 toward the upper right side of the vehicle. A transmission (not shown) that transmits power of the engine E to the rear wheel 3 is incorporated in the rear part of the crankcase 25.

Although the engine E is supported inside the vehicle body frame F, the lower part of the crankcase 25 is located below the lower ends of the down-frames 13.

Pairs of exhaust pipes 28 connected to exhaust ports of the respective cylinders are provided on the left and right outer surfaces of cylinder heads 27 of the one bank 26 and the other bank. A total of four exhaust pipes 28 on the left and right sides are drawn out in the forward direction and downwardly from the respective cylinders of the cylinder heads 27. Then, the exhaust pipes 28 are bent substantially horizontally to extend to the rear along the lower part of the crankcase 25 and be connected to a box-shaped collection chamber 29 provided below the swing arm 11. The collection chamber 29 is connected to a muffler 30 disposed on the outer lateral side of the swing arm 11.

On the lateral side of the rear parts of the exhaust pipes 28, an exhaust pipe cover 28*a* is provided for covering the rear parts of the exhaust pipes 28, the collection chamber 29, and the front part of the muffler 30 from the outer lateral side. Due to the provision of the exhaust pipe cover 28*a*, the rear parts of the exhaust pipes 28 look like they continuously lead to the front part of the muffler 30 in the side view. Thus, the appearance is enhanced.

The swing arm 11 is pivotally supported by a pivot shaft 31 inserted between the left and right center frames 15 in such a manner so as to be freely swingable. The swing arm 11 has a pair of left and right arms 11*a* extending from the front end part pivotally supported by the pivot shaft 31 to the lateral side of the rear wheel 3, and the rear wheel 3 is pivotally supported between the rear ends of the left and right arms 11*a*. The left arm 11*a* is formed into a hollow shape and a drive shaft (not shown) is connected to the transmission of the engine E and is provided inside the hollow shape. The rear wheel 3 is driven via the drive shaft.

A rear shock absorber unit 32 is stretched between the rear part of the swing arm 11 and the above-described seat frame.

An air cleaner box 33 to take in air for the engine E is disposed between the left and right main frames 14 above the engine E. A throttle body (not shown) is connected to the air cleaner box 33 and is disposed between the one bank 26 and the other bank. A fuel tank (not shown) in which fuel for the engine E is stored is disposed rearwardly of the engine E and below the seat 10.

A radiator 34 is disposed forward of the engine E along the down-frames 13.

FIG. 2 is a plan view of the vehicle body front part as viewed from above.

As shown in FIGS. 1 and 2, the vehicle body cover C includes a front cowl 40 covering the head pipe 12 from the front side, a pair of left and right front side cowls 41 laterally covering the head pipe 12 and the air cleaner box 33, a tank-shaped cover 42 covering the main frames 14 from above between the front side cowls 41 and the seat 10, and a pair of left and right shrouds 43 extending downwardly from the lower edges of the front parts of the front side cowls 41. The vehicle body cover C further includes a top surface cover 44 covering the space between the above-described steering system and the front side cowls 41 in a top view, a pair of left and right middle covers 45 covering the space among the tank-shaped cover 42, the seat 10, and the step stays 17, and a pair of left and right rear side covers 46 covering the above-described seat frames below the seat 10. On the front cowl 40, rearview mirrors 47 are provided that protrude in the vehicle width direction. In the present embodiment, the right rearview mirror 47 of the rearview mirrors 47 is so shown that a body to be described later is removed in order to diagrammatically represent the inside.

To the upper part of the front cowl 40, a front screen 48 is attached that extends rearwardly and upwardly from the upper edge. A headlight 49 illuminating the front side is joined to the lower edge of the front cowl 40. The upper side of the front wheel 2 is covered by a front fender 50.

Figure 3:
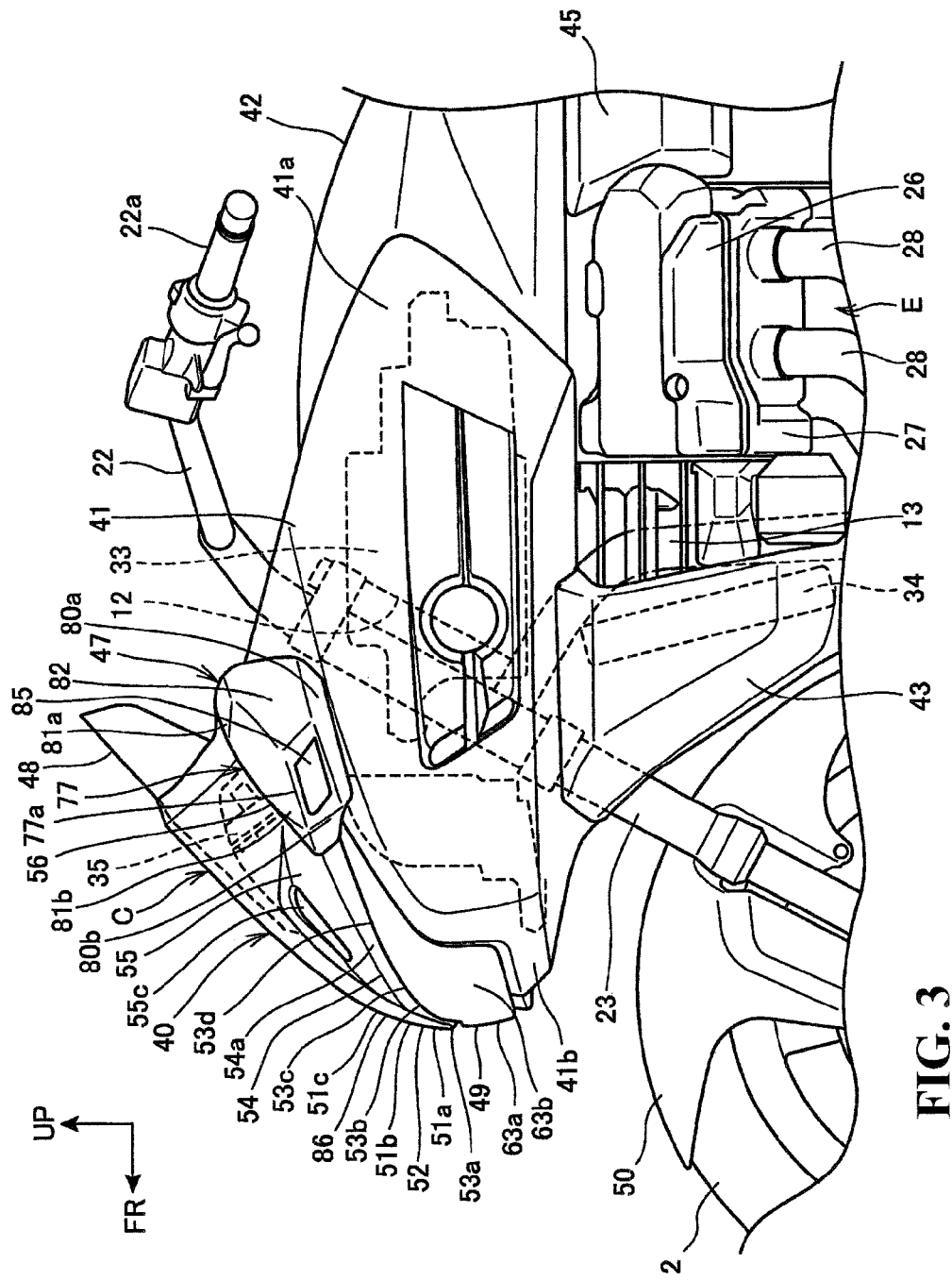
FIG. 3 is a left side view of the vehicle body front part.
Figure 4:
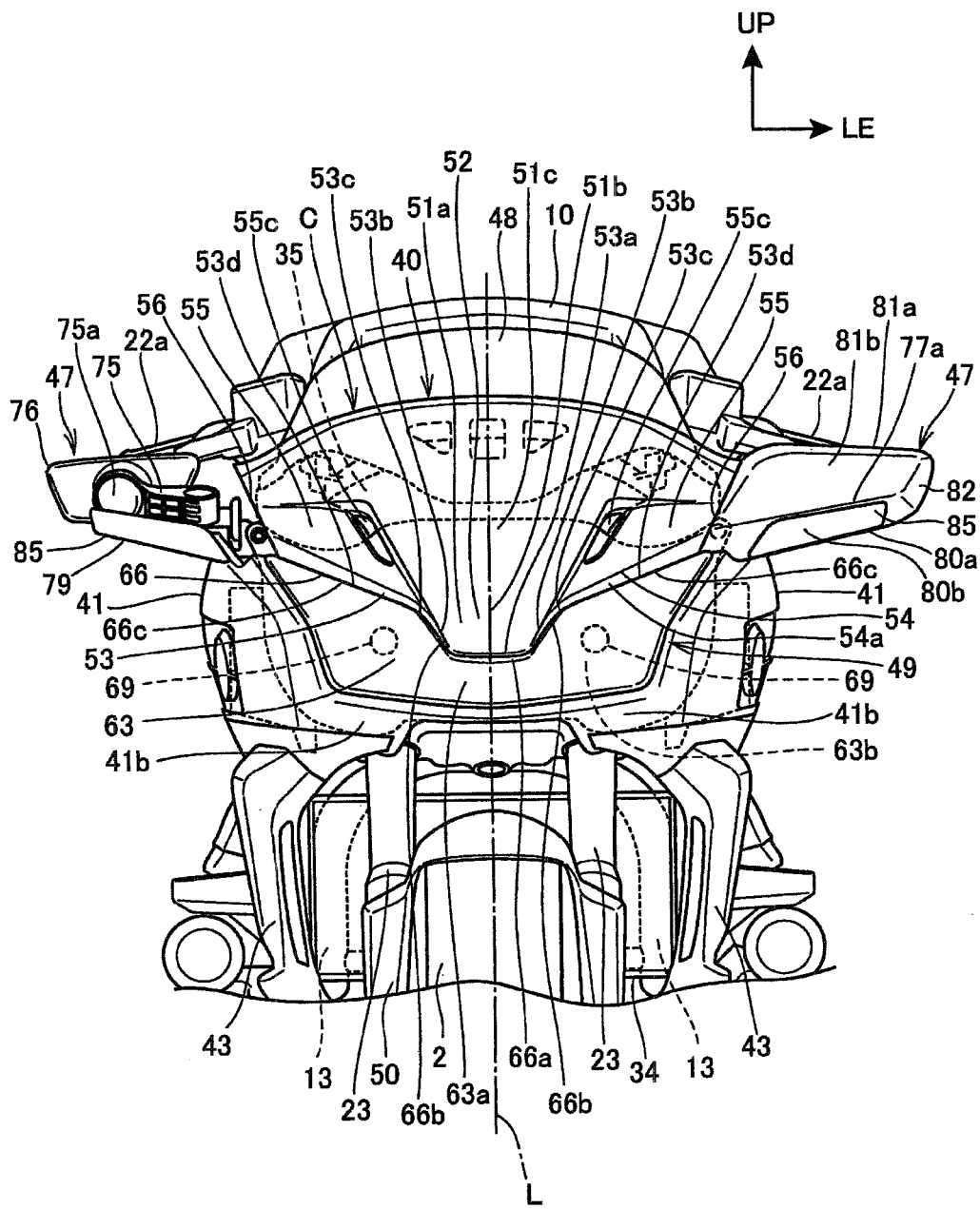
FIG. 4 is a front view of the vehicle body front part.
Figure 5:
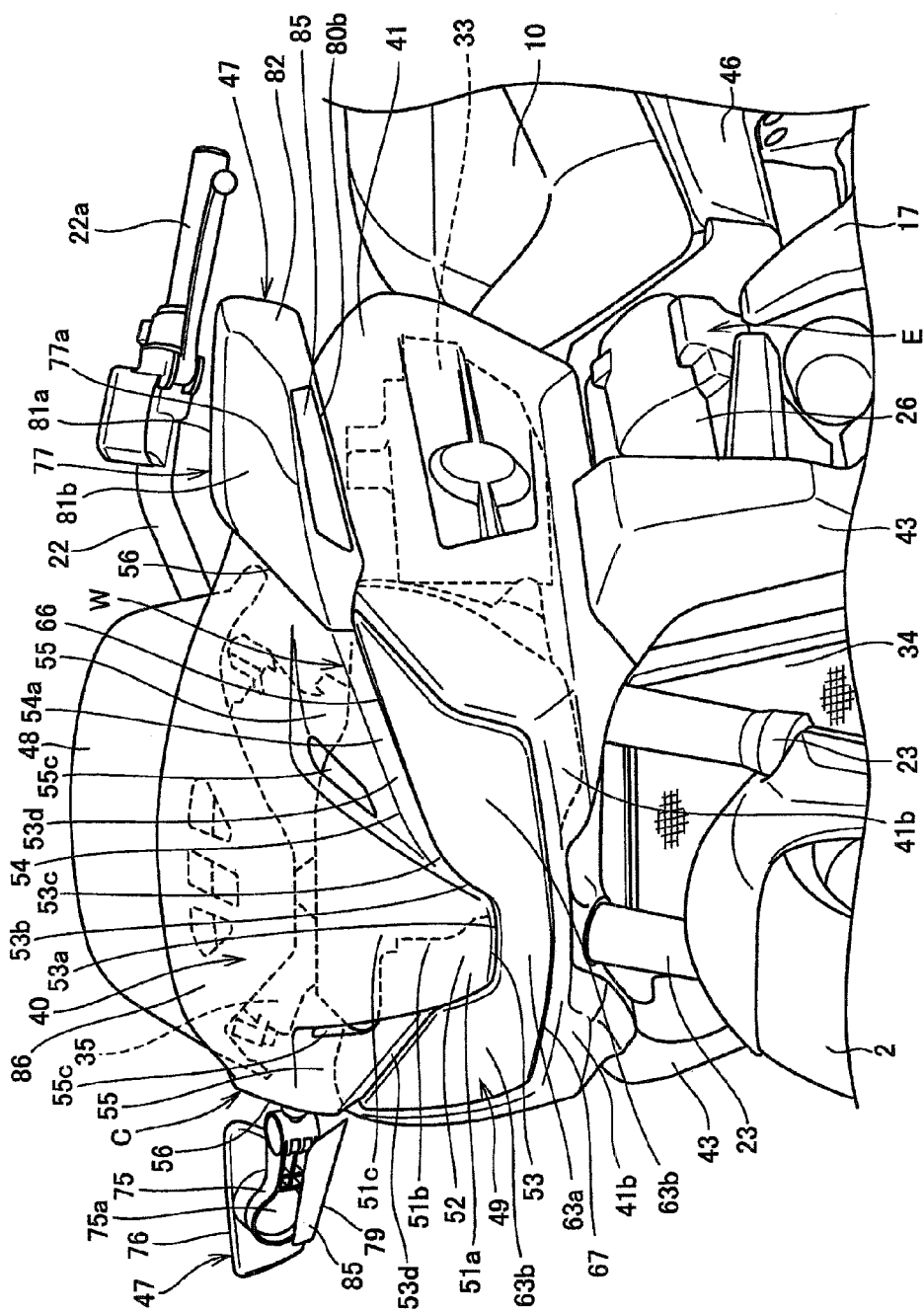
FIG. 5 is a perspective view of the vehicle body front part.

FIG. 3 is a left side view of the vehicle body front part. FIG. 4 is a front view of the vehicle body front part. FIG. 5 is a perspective view of the vehicle body front part.

As shown in FIGS. 2 to 5, the front cowl 40 is a plate-shaped cover that is inclined so as to rise rearwardly so that the resistance of a flow of air may become lower. In addition, the center part thereof in the vehicle width direction is convex toward the upper front side in a curved surface manner. The front cowl 40 covers the upper part of the steering system such as the head pipe 12 and the front forks 23 from the front side.

The headlight 49 is formed into a curved surface shape that is convex toward the front side in a top view in conformity with the shape of the front cowl 40. The headlight 49 is attached so that its front surface is continuous with the lower edge of the front cowl 40 for covering the upper part of the steering system such as the head pipe 12 and the front forks 23 from the front side. More specifically, the front surface of the headlight 49 functions as part of a cover covering the upper part of the steering system from the front side.

The front cowl 40 and the headlight 49 are fixed to the vehicle body frame F with the intermediary of a stay 12*a* (FIG. 12) provided in front of the head pipe 12.

The front screen 48 is formed into a curved surface shape along the upper edge of the front cowl 40 and is fixed to the inner surface of the upper part of the front cowl 40.

A meter unit 35 (FIG. 3) indicating information on the vehicle velocity and so forth is disposed below the upper part of the front cowl 40 and above the headlight 49.

The front side cowls 41 are provided continuously with left and right side edge parts of the front cowl 40 and the headlight 49 and extend rearwardly. The front side cowls 41 have a gentle curved surface shape extending more outward in the vehicle width direction at a position closer to the rear side. The front side cowls 41 laterally cover the air cleaner box 33 and the main frames 14, and rear parts 41a thereof located above the one bank 26 and the other bank are joined to the left and right side surfaces of the front part of the tank-shaped cover 42 in such a manner so as to overlap from the outside.

Furthermore, the respective front side cowls 41 have a front extended part 41b that extends around from the outside to the front surface side of the headlight 49 and is joined to the lower edge of the headlight 49.

The tank-shaped cover 42 is a cover that is formed into an upward-convex curved surface shape and has the appearance of a fuel tank shape. It covers the engine E and the left and right main frames 14 from above. The side parts of the tank-shaped cover 42 are formed so as to become narrower in the vehicle width direction at a position closer to the rear side so that the rider on the seat 10 may easily knee-grip the tank-shaped cover 42.

The shrouds 43 are formed into a triangular shape tapering downwardly and extend downwardly from the front parts of the front side cowls 41 to laterally cover the radiator 34.

The bar handle 22 is fixed to the upper bridge 23a and extends toward the upper rear side and the outside in the vehicle width direction. Left and right grip parts 22a of the bar handle 22 grasped by the rider are located above the rear parts of the front side cowls 41 and more outside in the vehicle width direction than the front side cowls 41 and the front cowl 40.

The rearview mirrors 47 are provided so as to protrude in the vehicle width direction from left and right edge parts of the front cowl 40. Regarding the vertical direction, they are provided above the headlight 49 and at such positions that the upper parts thereof overlap with the grip parts 22a in the front view. Regarding the front-rear direction, they are juxtaposed to the front screen 48 on the outer lateral side at the rear parts of the front cowl 40 and are disposed more forward than the grip parts 22a and the head pipe 12.

Next, the vehicle body front structure around the front cowl 40 will be described in detail.

Figure 6:
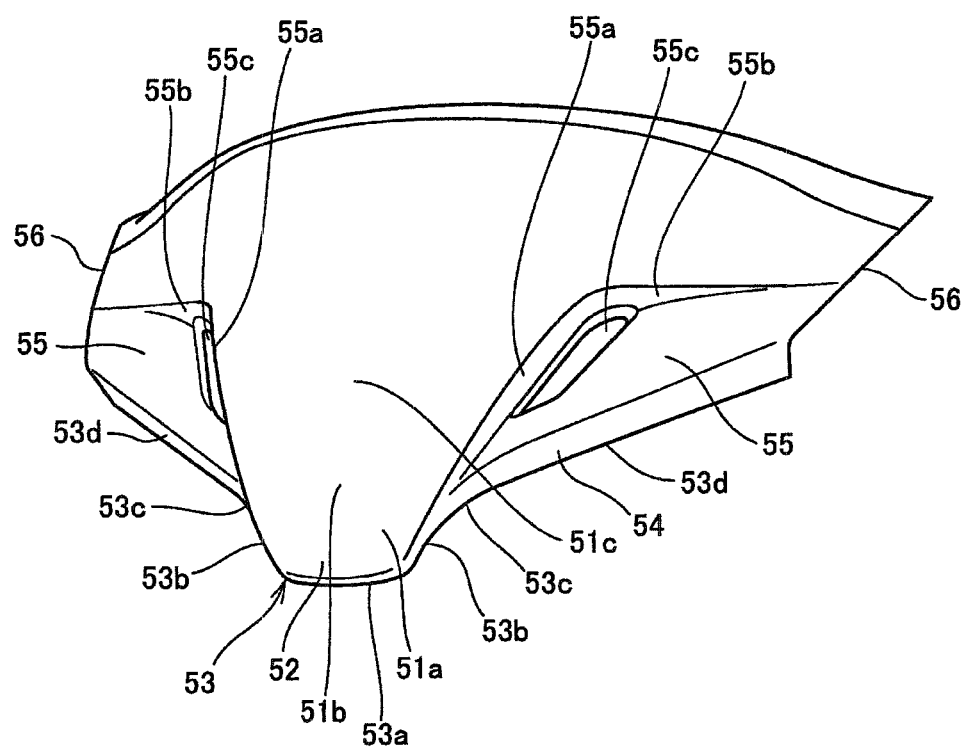
FIG. 6 is a perspective view of a front cowl.

FIG. 6 is a perspective view of the front cowl 40.

The front cowl 40 is formed into a substantially fan shape. It tapers toward the front end and has a wider width at a position closer to the rear side. The front cowl 40 is set so that a center line L (FIG. 4) bisecting the fan shape into left and right parts substantially corresponds with the center in the vehicle width direction of the motorcycle 1. In addition, it is formed into a curved surface shape that is convex toward the upper front side in such a manner so that both the left and right parts are bent rearwardly on the basis of the center line L. Furthermore, as shown in FIG. 3, in the side view, the part at the front end of the top surface of the front cowl 40 along the center line L has a vertical surface 51a (front end surface) extending substantially vertically from the lower end and an inclined surface 51c that originates from rearward inflection toward the horizontal plane at an inclination change point 51b at the upper part of the vertical surface 51a and obliquely extends upwardly and rearwardly.

The front cowl 40 has, at the lower end of its center part, a front end extended part 52 that has a predetermined width dimension and extends downward in a tongue manner. The vertical surface 51a is formed in the front surface of the front end extended part 52. The width of the front end extended part 52 is smaller than that of the front wheel 2 (FIG. 4).

A lower edge part 53 of the front cowl 40 is a part continuous with the upper edge of the headlight 49. The lower edge part 53 has the following parts a horizontal lower edge part 53a that is at the lower end of the front end extended part 52 and extends along the vehicle width direction; side edge parts 53b that extend with an inclination obliquely upwardly and rearwardly toward the outside in the vehicle width direction from the left and right ends of the horizontal lower edge part 53a and form the left and right side edges of the front end extended part 52 and upside lower edge parts 53d that originate from an inflection at side inclination change points 53c at the upper parts of the side edge parts 53b and extend obliquely upwardly and rearwardly toward the outside in the vehicle width direction and toward the rearview mirrors 47 with an inclination gentler than the side edge parts 53b.

In the side view of FIG. 3, the side inclination change point 53c exists at a position substantially corresponding with the inclination change point 51b of the vertical surface 51a in the vertical direction, and is located slightly more to the rear than the inclination change point 51b in the front-rear direction.

At the horizontal lower edge part 53a, the side edge parts 53b, and the upside lower edge parts 53d of the front cowl 40, a step part 54 protruding forward is formed over the whole length of the lower edge part 53. The step part 54 is formed so that the lower edge of the front cowl 40 is folded back toward the lower rear side. The folded part serves as an overhang surface 54a that is inclined so as to extend rearwardly and downwardly.

In the front cowl 40, step parts 55 made by denting the top surface of the front cowl 40 are formed above the upside lower edge parts 53d. The step parts 55 are defined by sidewall parts 55a extending upwardly along extended lines of the side edge parts 53b and upper wall parts 55b laterally extending from the upper ends of the sidewall parts 55a toward the rearview mirrors 47. A ventilator 55c along the sidewall part 55a is formed in each step part 55. Part of a flow of air flowing along the step part 55 flows into the inside of the front cowl 40 from the ventilator 55c and it is also possible to utilize this flow of air as cooling air to cool the headlight 49.

The front cowl 40 has cowl side edge parts 56 that extend upwardly from the outer ends of the upside lower edge parts 53d and lead to the upper edge of the front cowl 40. The cowl side edge parts 56 are parts continuous with the base parts of the rearview mirrors 47.

Figure 7:
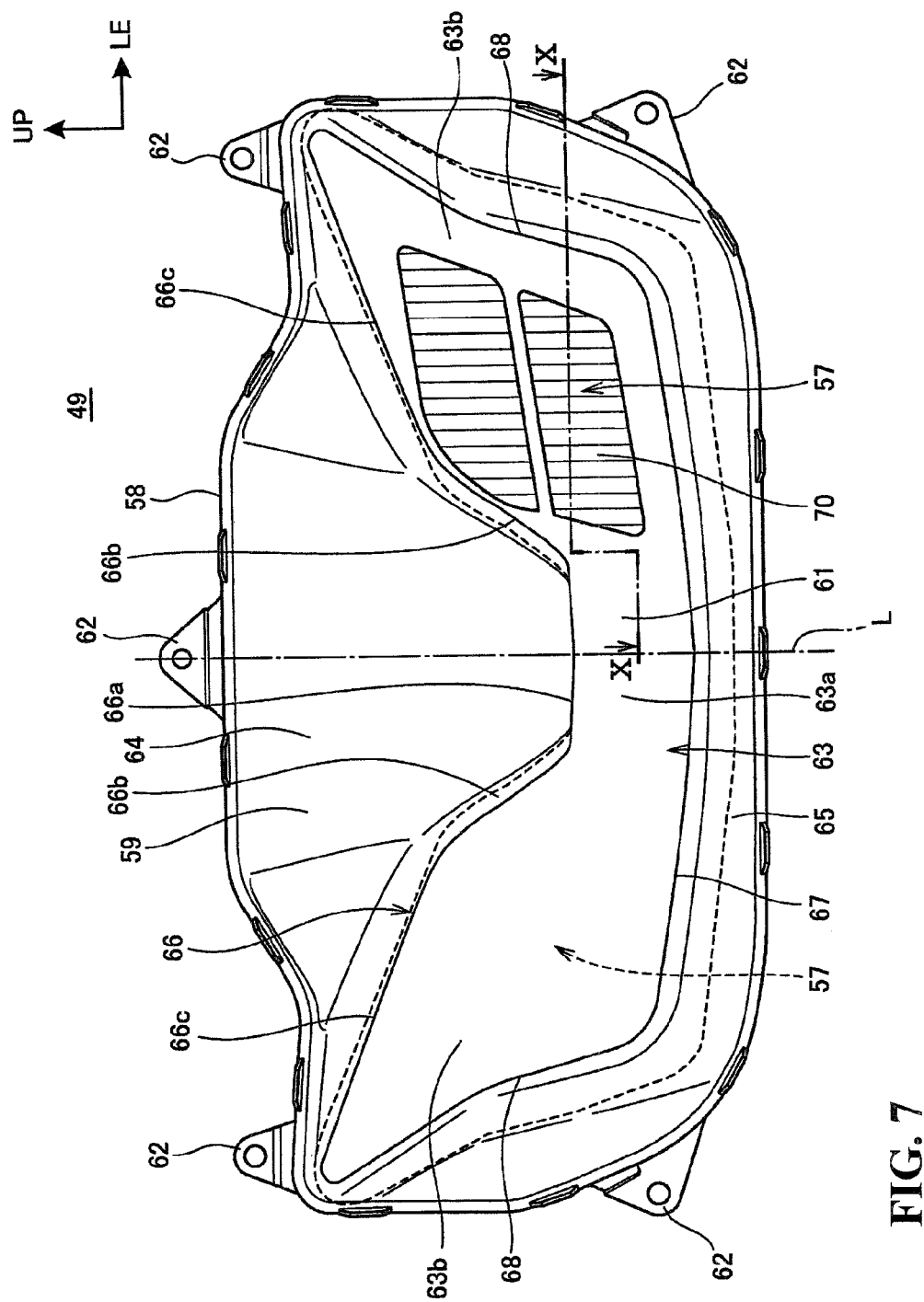
FIG. 7 is a front view of a headlight.
Figure 8:
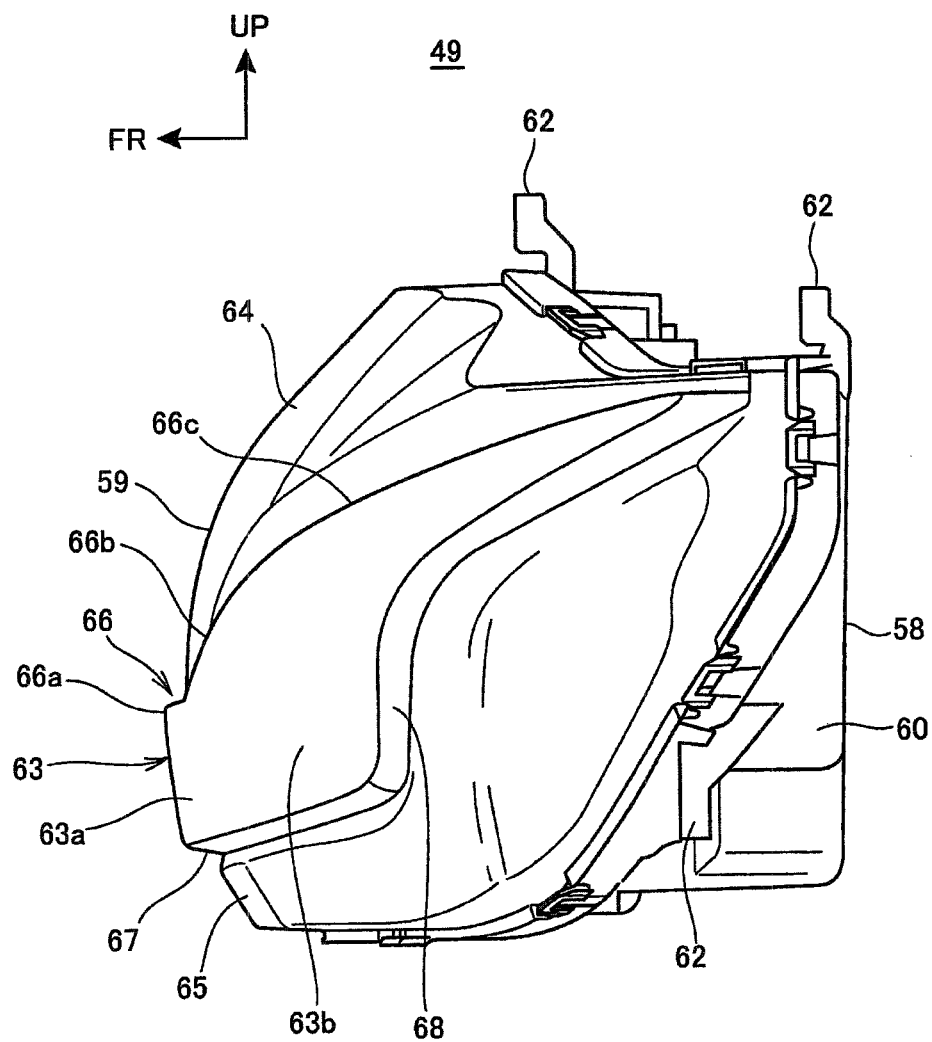
FIG. 8 is a left side view of the headlight.
Figure 9:
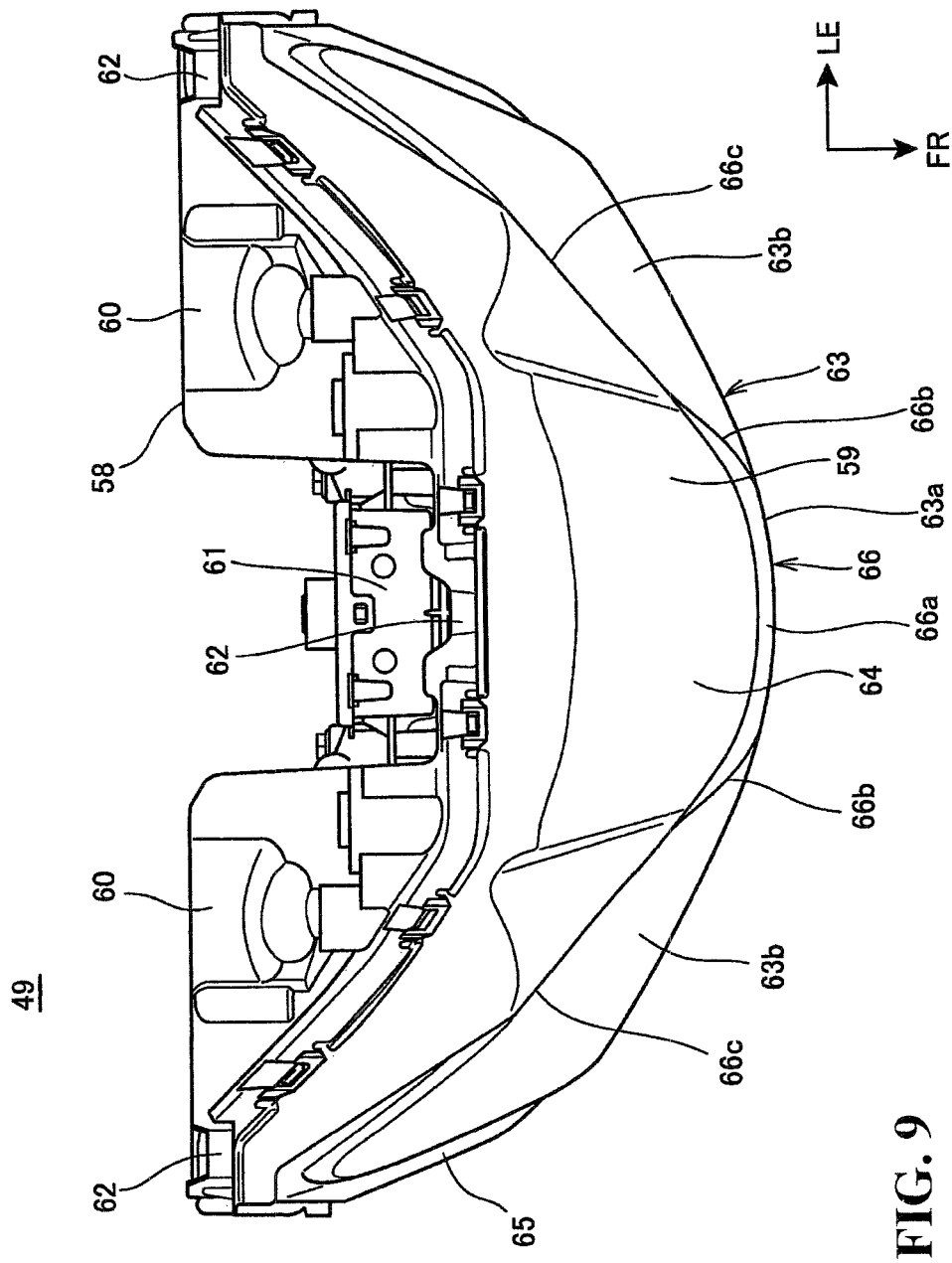
FIG. 9 is a top view of the headlight.
Figure 10:
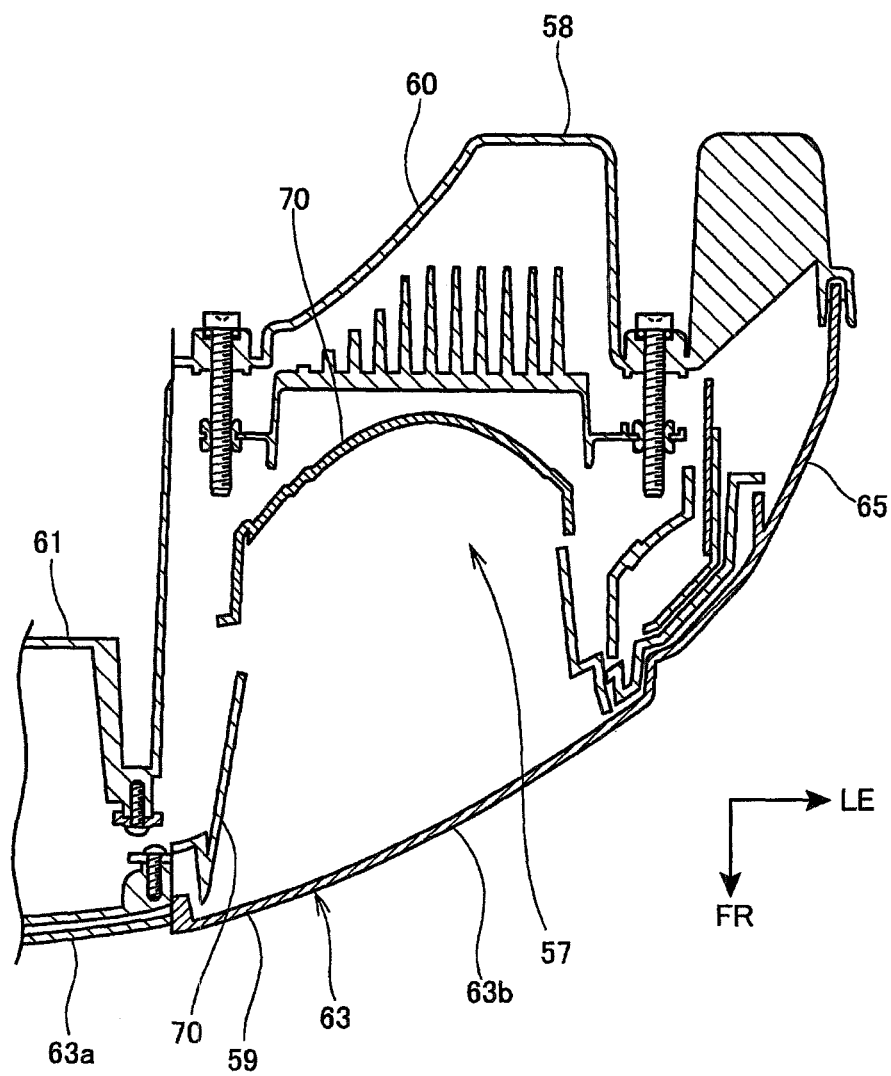
FIG. 10 is a sectional view along line X-X in FIG. 7.

FIG. 7 is a front view of the headlight 49. FIG. 8 is a left side view of the headlight 49. FIG. 9 is a top view of the headlight 49. FIG. 10 is a sectional view along line X-X in FIG. 7.

As shown in FIGS. 5 and 7 to 10, the headlight 49 is a two-lamp headlight including lamps 57 on the left and right sides of the center line L, and is formed long in the vehicle width direction.

The headlight 49 is composed of two sections divided in the front-rear direction it includes a case 58 to house the lamps 57 on the rear side and a lens-equipped cover 59 covering the front surface side of the case 58.

The case 58 has a pair of left and right lamp housings 60 to house the lamps 57 and a coupling part 61 that laterally couples the lamp housings 60 at the front part. A plurality of stays 62 protruding outwardly are provided at the upper edge and side edges of the case 58 and the headlight 49 is fixed to the vehicle body frame F with the intermediary of the stays 62.

The lens-equipped cover 59 has a transparent lens surface 63 covering the lamps 57 from the front side, a cover upper part 64 that is continuous with an upper edge 66 of the lens surface 63 and is covered by the lower part of the front cowl 40 from the front side, and a cover lower part 65 that is continuous with the side edges and lower edge of the lens surface 63 and is covered by the front parts of the front side cowls 41 from the front side. The peripheral parts of the cover upper part 64 and the cover lower part 65 are a mating surface fitted to the opening edge of the front surface of the case 58.

The whole of the lens surface 63 is formed so as to protrude forward relative to the cover upper part 64 and the cover lower part 65 and the edge part of the lens surface 63 is a step part across the whole circumference. The upper edge 66 of the lens surface 63 is formed into a shape along the lower edge part 53 of the front cowl 40. The upper edge 66 has the following parts a horizontal upper edge part 66a along the horizontal lower edge part 53a of the front end extended part 52 of the front cowl 40; inside upper edge parts 66b extending with an inclination obliquely upward and rearward toward the outside in the vehicle width direction along the side edge parts 53b and outside upper edge parts 66c extending upwardly and rearwardly toward the outside and toward the rearview mirrors 47 along the upside lower edge parts 53d with an inclination gentler than the inside upper edge parts 66b.

More specifically, the upper edge 66 of the lens surface 63 and the lower edge part 53 of the front cowl 40 are continuously disposed and connected. At this connection part, the step part 54 is formed along the upper edge 66 of the lens surface 63.

The lens surface 63 has a shape in conformity with the front end extended part 52 of the front cowl 40. Therefore, the vertical width is small at the horizontal upper edge part 66a and is large at the inside upper edge parts 66b and the outside upper edge parts 66c. More specifically, the lens surface 63 has a lens center part 63a that is at the center in the vehicle width direction and has a small vertical width and lens emission parts 63b that are laterally continuous with the lens center part 63a and have a vertical width larger than that of the lens center part 63a. FIG. 7 shows the state in which the inside of the left part of the lens surface 63 is visually recognized through the transparent lens surface 63.

Furthermore, the lens surface 63 has a lower edge 67 extending along the vehicle width direction and side edges 68 that extend upwardly and rearwardly toward the outside and toward the rearview mirrors 47 from the left and right ends of the lower edge 67 and lead to the upper ends of the outside upper edge parts 66c.

Although protruding forward, the lens surface 63 is substantially flush with the front cowl 40 and the front side cowls 41 when being attached. Due to the combination of the lens surface 63 and the front cowl 40, a front cowl surface 86 continuously covering the vehicle body front surface is formed.

Each lamp 57 has a bulb 69 (FIG. 4) serving as a light source and a reflector 70 that is disposed to the rear of the bulb 69 and reflects light forward. Each lamp 57 is housed in the lamp housing 60 and its front side is covered by the lens surface 63. No lamp is provided at the coupling part 61 between the left and right lamp housings 60.

More specifically, the lamps 57 are covered by the lens emission parts 63b and light of the lamps 57 is transmitted through the lens emission parts 63b to be irradiated forward. In the headlight 49, the space inside the lens center part 63a is substantially separated from the spaces inside the lens emission parts 63b by the respective reflectors 70. Thus, the light of the lamps 57 does not reach the lens center part 63a and light is hardly irradiated from the lens center part 63a.

In the present embodiment, the lens emission parts 63b are disposed so as to be separated into the left and right sides. However, one plate-shaped lens surface 63 is shared by the left and right lens emission parts 63b and therefore the structure of the headlight 49 can be simplified. Furthermore, the inside of the lens center part 63a has a small vertical width. Thus, heat easily accumulates therein compared with the inside of the lens emission parts 63b. However, because light is not emitted from the lens center part 63a, the heat accumulation at the lens center part 63a can be prevented.

Figure 11:
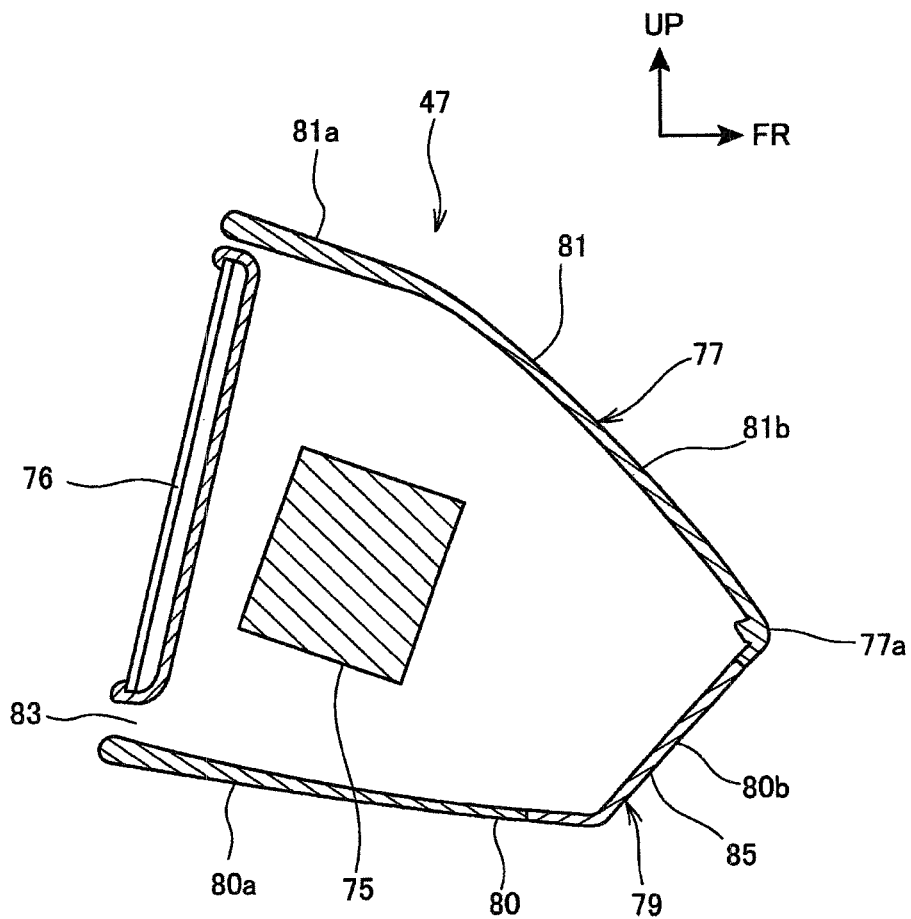
FIG. 11 is a sectional view along line XI-XI in FIG. 2.

FIG. 11 is a sectional view along line XI-XI in FIG. 2.

As shown in FIGS. 2 to 5 and 11, the rearview mirrors 47 respectively have a mirror stay 75 provided at the vehicle front part near the front cowl 40, a plate-shaped mirror 76 (mirror surface) supported by the mirror stay 75, a body 77 that houses the mirror stay 75 and the mirror 76 and is attached to the mirror stay 75, and a blinker 79 provided in the body 77. In the rearview mirrors 47, the mirror stay 75 is covered by the body 77. In addition, the body 77 is smoothly continuous with the front cowl 40 and the front side cowl 41 and is provided monolithically with the vehicle body cover C.

A base 78 to which the mirror stay 75 is attached is provided near each of the cowl side edge parts 56 of the front cowl 40.

The mirror stay 75 is formed into an arm shape protruding outward in the vehicle body direction, and its base end part is attached to the base 78 with the intermediary of a shaft 78a oriented along the vertical direction. On the rear surface of the tip of the mirror stay 75, a joint portion 75a to which the mirror 76 is attached is provided. The mirror 76 has a projection 76a fitted to the joint portion 75a on the rear surface side and is swingable in the vertical and lateral directions around the joint portion 75a. More specifically, the mirror 76 is independently adjusted in angle by swinging around the joint portion 75a. Furthermore, the rearview mirrors 47 can pivot rearwardly around the shaft 78a on the base part side. Thus, when being pushed from the front side, the rearview mirrors 47 pivot rearwardly to parry the force.

The body 77 is formed into a flattened shape that is long in the vehicle width direction than in the vertical direction, and its front part is formed into a forward-convex curved surface shape.

The body 77 has the following elements a lower wall part 80 covering the mirror stay 75 from the lower side; an upper wall part 81 covering the mirror stay 75 from the upper side; a sidewall part 82 covering the tip of the mirror stay 75 from the outside in the vehicle width direction; an open plane 83 that is opened rearwardly and at which the mirror 76 is disposed; and an inner wall part 84 (FIG. 2) that is connected to the cowl side edge part 56 of the front cowl 40 and through which the mirror stay 75 is made to pass.

More specifically, the upper wall part 81 has an upper wall rear part 81a that is inclined so as to fall forward at the rear part and an upper inclined surface 81b that is continuous with the front side of the upper wall rear part 81a and is inclined so as to fall forward with an inclination larger than the upper wall rear part 81a. The lower wall part 80 has a lower wall rear part 80a that is inclined so as to fall forward at the rear part and a mirror-side overhang surface 80b (inclined surface) that is continuous with the front side of the lower wall rear part 80a and is inclined so as to rise forward.

The upper inclined surface 81b and the mirror-side overhang surface 80b connect to each other at a front edge 77a of the body 77. This forms a forward-convex curved surface shape. The upper inclined surface 81b can be deemed as the top surface of the body 77 as well as the front surface.

Furthermore, the mirror-side overhang surface 80b can be deemed as the front surface of the body 77 as well as the lower surface. The mirror-side overhang surface 80b can also be deemed to be so inclined as to fall rearward and is an overhanging surface.

As shown in FIG. 4, in front view, the upper wall rear part 81a extends toward the outer lateral side substantially horizontally and the lower wall rear part 80a is inclined so as to be higher at a position closer to the outer lateral side. The body 77 is formed so as to taper toward the outer lateral side. The ridge line of the front edge 77a of the body 77 and the mirror-side overhang surface 80b are inclined so as to be higher at a position closer to the outer lateral side. The sidewall part 82 is inclined so as to be higher at a position closer to the outer lateral side in front view.

As shown in FIG. 2, in the plan view, the front edge 77a of the body 77 is inclined so as to be located more rearwardly at a position closer to the outer lateral side, and the upper inclined surface 81b and the mirror-side overhang surface 80b are also inclined so as to be located more rearwardly at a position closer to the outer lateral side. Furthermore, the sidewall part 82 is inclined so as to be located more to the rear at a position closer to the outer lateral side with an inclination larger than the front edge 77a in the plan view. The open plane 83 and the mirror 76 are inclined so as to be located more rearwardly at a position closer to the outer lateral side in the plan view.

The blinker 79 has an emission part (not shown) and a blinker lens 85 covering this emission part and is incorporated in the body 77. The blinker lens 85 is monolithically buried in the mirror-side overhang surface 80b of the body 77 and serves as part of the mirror-side overhang surface 80b. That is, the blinker lens 85 is provided so as to be flush with the mirror-side overhang surface 80b around it and the mirror-side overhang surface 80b is a smooth surface. The emission part of the blinker 79 is disposed on the rear surface side of the blinker lens 85 in the body 77.

Because the blinker lens 85 is provided in the mirror-side overhang surface 80b and thus exists at a position invisible from the rider on the seat 10, light emission of the blinker 79 can be prevented from interfering with the rider.

Each rearview mirror 47 is attached in a state wherein the upper wall part 81 of the body 77 is smoothly continuous with the top surface of the front cowl 40 near the cowl side edge part 56 and the mirror-side overhang surface 80b is smoothly continuous with the overhang surface 54a of the step part 54 of the front cowl 40. Due to this continuous, smooth connecting of the overhang surface 54a and the mirror-side overhang surface 80b, a flow aligning way W along which the overhanging surface is continuous from the front end of the front cowl 40 to the outer end of the rearview mirror 47 is formed at the front part of the vehicle body cover C.

As shown by a dashed line in FIG. 2, the flow aligning way W is formed into a shape that always extends obliquely rearwardly from the front end of the front cowl 40 to the outer end of the rearview mirror 47. Therefore, a flow of air smoothly flows along the flow aligning way W.

Figure 12:
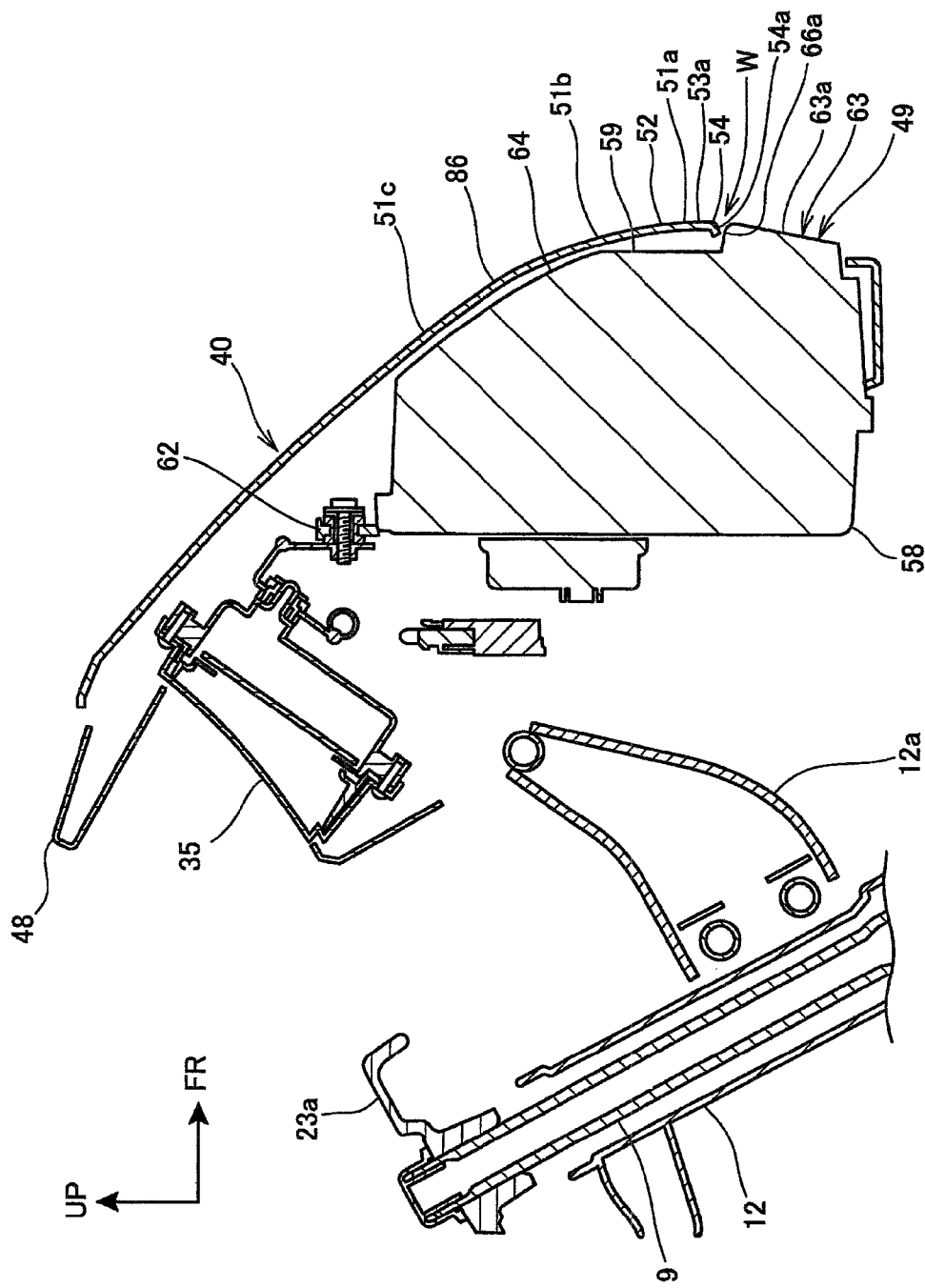
FIG. 12 is a sectional view along line XII-XII in FIG. 2.

FIG. 12 is a sectional view along line XII-XII in FIG. 2.

As shown in FIGS. 12 and 4, in the section of the front cowl 40 along the center in the vehicle width direction, the step part 54 protrudes more in the forward direction than the upper part of the lens surface 63 near the step part 54, and the front end of the overhang surface 54a is also located more in the forward direction than the upper part of the lens surface 63 near the step part 54. The overhang surface 54a of the step part 54 is located above the horizontal upper edge part 66a of the headlight 49 successively to the horizontal upper edge part 66a, and the flow aligning way W is made between the overhang surface 54a and the horizontal upper edge part 66a. More specifically, due to the forward protrusion of the step part 54, the flow aligning way W is formed between the step part 54 and the upper edge 66 of the lens surface 63. At this part, raindrops that have adhered to the headlight 49, which is the lower part of the front cowl surface 86, from the front side are made to flow upward by a flow of air. Part of the raindrops flow laterally outwardly along the flow aligning way W. Most of the raindrops flow rearwardly and upwardly along the vertical surface 51a and the inclined surface 51c and then separate rearwardly and upwardly from the upper end of the front screen 48.

Figure 13:
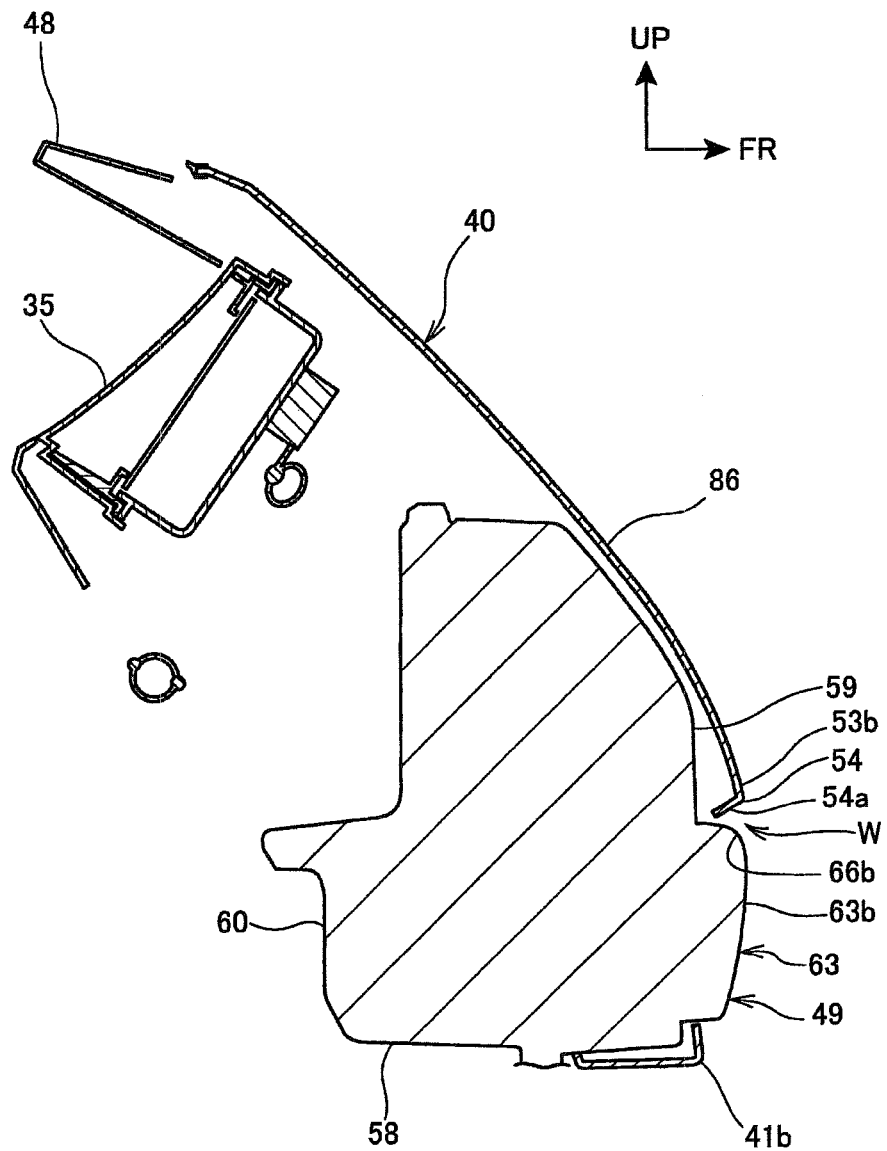
FIG. 13 is a sectional view along line XIII-XIII in FIG. 2.

FIG. 13 is a sectional view along line XIII-XIII in FIG. 2.

As shown in FIGS. 13 and 4, in a section of the side edge part 53b in the front cowl 40, the step part 54 protrudes more in the forward direction than the upper part of the lens surface 63 near the step part 54, and the front end of the overhang surface 54a is also located more in the forward direction than the upper part of the lens surface 63 near the step part 54. The overhang surface 54a is located above the inside upper edge part 66b of the headlight 49 successively to the inside upper edge part 66b, and the flow aligning way W is made between the overhang surface 54a and the inside upper edge part 66b. At this part, because the flow aligning way W is inclined obliquely upwardly and rearwardly toward the outside in the vehicle width direction, raindrops that adhere to the headlight 49 and flow upwardly readily flow along the flow aligning way W, and most raindrops flow obliquely upwardly toward the outside in the vehicle width direction along the flow aligning way W.

As shown in FIG. 3, near the front end extended part 52, the inclination change point 51b, at which rearward inflection toward the horizontal plane from the vertical surface 51a at the front end is made, and the side inclination change point 53c, from which the overhang surface 54a of the step part 54 extends with change in the orientation to the lateral direction from the side of the vertical surface 51a, are so set that the side inclination change point 53c is located more in the rear direction than the inclination change point 51b in the side view. Therefore, on the side of the inclination change point 51b, raindrops can be made to efficiently flow rearwardly. On the side of the side inclination change point 53c, raindrops come to horizontally flow to come to readily flow rearwardly and then laterally flow along the overhang surface 54a. Thus, the raindrops can be made to smoothly flow.

Figure 14:
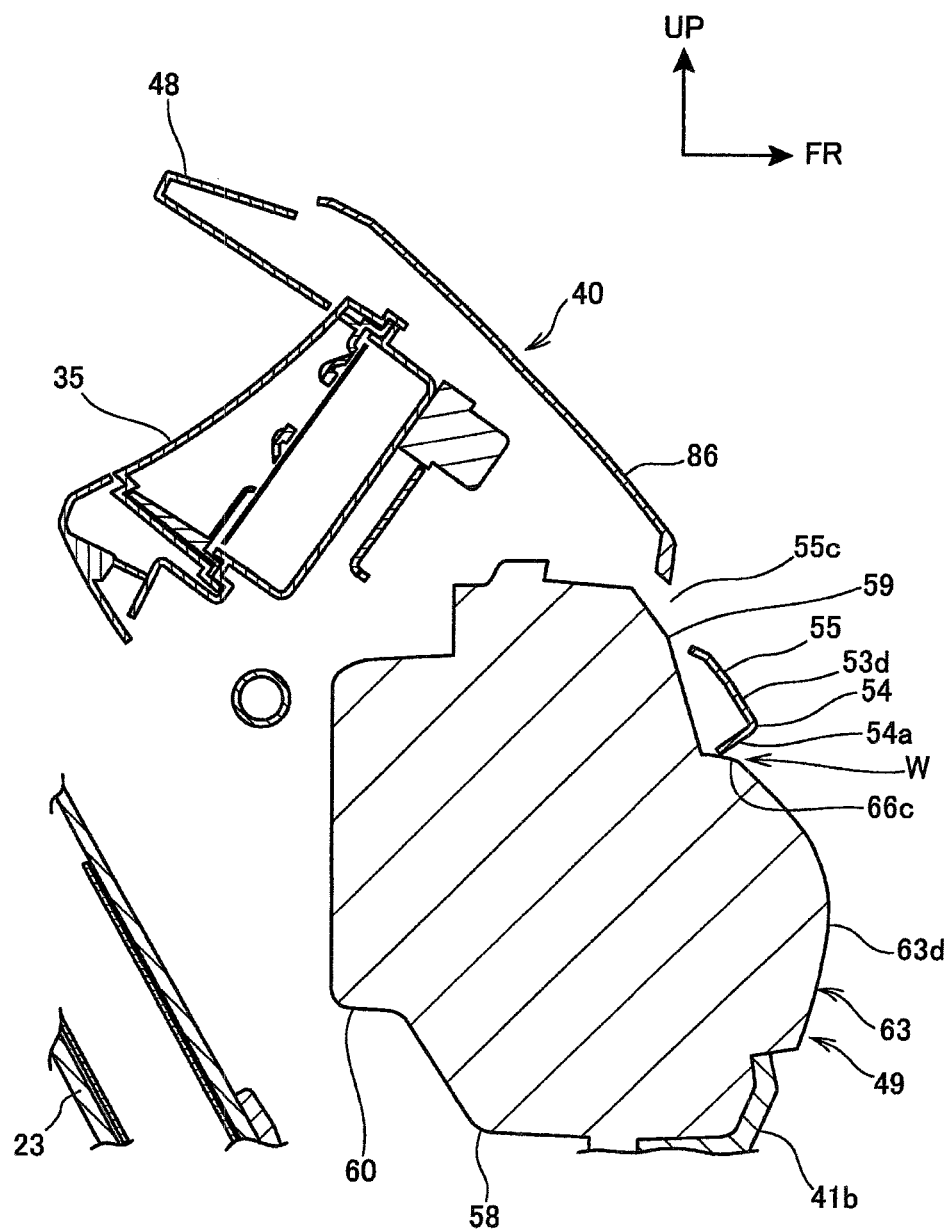
FIG. 14 is a sectional view along line XIV-XIV in FIG. 2.

FIG. 14 is a sectional view along line XIV-XIV in FIG. 2.

As shown in FIGS. 14 and 4, in a section of the upside lower edge part 53d in the front cowl 40, the step part 54 protrudes more in a forward direction than the upper part of the lens surface 63 near the step part 54, and the front end of the overhang surface 54a is also located more in a forward direction than the upper part of the lens surface 63 near the step part 54. The overhang surface 54a is located above the outside upper edge part 66c of the headlight 49 successively to the outside upper edge part 66c, and the flow aligning way W is made between the overhang surface 54a and the outside upper edge part 66c. At this part, because the flow aligning way W is inclined obliquely upwardly and rearwardly toward the outside in the vehicle width direction, raindrops that adhere to the headlight 49 and flow upwardly readily flow along the flow aligning way W, and most raindrops flow obliquely upwardly and rearwardly toward the outside in the vehicle width direction along the flow aligning way W. Furthermore, raindrops flowing along the flow aligning way W of the front cowl 40 flow to the mirror-side overhang surface 80b of the rearview mirror 47 continuous with the outer end of the outside upper edge part 66c. Then, the raindrops travel on the mirror-side overhang surface 80b to flow to the sidewall part 82 and separate rearwardly from the sidewall part 82. Because the sidewall parts 82 are located more outward than the left and right grip parts 22a of the bar handle 22, it is possible to suppress adhesion of raindrops splashing rearward from the sidewall parts 82 to the arms of the rider.

Moreover, when a crosswind blows against the front cowl 40, part of this crosswind separates at the overhang surface 54a of the step part 54 and therefore it is hard for the crosswind to affect the motorcycle 1.

As described above, according to the embodiment to which the present invention is applied, the lens surface 63 of the headlight 49 and the upper part of the front cowl 40 each have a surface that is inclined so as to extend upwardly and rearwardly with the front cowl surface 86 continuously covering the vehicle body front surface being formed by combining them. At the connection part between the front cowl 40 and the upper edge 66 of the lens surface 63 of the headlight 49, the step part 54 is made that protrudes more forward than the lens surface 63. This step part 54 extends outwardly in the vehicle width direction to the base parts of the rearview mirrors 47 along the upper edge 66 of the lens surface 63, and the mirror-side overhang surfaces 80b continuously leading to the step part 54 are made in the rearview mirrors 47. Therefore, raindrops hitting on the lower side of the headlight 49 flow to the ends of the left and right rearview mirrors 47 along the step part 54 of the front cowl 40 and the mirror-side overhang surfaces 80b of the rearview mirrors 47. Thus, splashes of the raindrops on the rider can be suppressed. Furthermore, part of a flow of air flowing along the front cowl 40 separates at the step part 54 of the front cowl 40. This avoids the situation in which a flow of air flows along the surface of the front cowl 40 over a long distance and thus can suppress the influence of a crosswind on the motorcycle 1.

Furthermore, in the upper edge 66 of the headlight 49, the height is low at the horizontal upper edge part 66a at the center and the inside upper edge parts 66b and the outside upper edge parts 66c rise obliquely upward toward the lateral sides. Therefore, raindrops flow to the left and right rearview mirrors 47 more smoothly. This can suppress splashes of the raindrops on the rider.

In addition, the rearview mirrors 47 have monolithic shapes that are smoothly continuous from the front cowl 40 to the bodies 77 of the rearview mirrors 47, and the angle of the mirror 76 can be independently adjusted. Thus, it is possible to prevent the situation in which the seam between the front cowl 40 and the body 77 hinders the flow of raindrops and the raindrops smoothly flow to the rearview mirrors 47. This can suppress splashes of the raindrops on the rider.

Moreover, the inclination change point 51b, at which inflection toward the horizontal plane from the vertical surface 51a at the front end of the front cowl 40 is made, and the side inclination change points 53c, from which the upside lower edge parts 53d of the overhang surface 54a of the step part 54 extend with a change in the orientation to the lateral directions from the side edge parts 53b, are set so that the side inclination change point 53c is located more to the rear than the inclination change point 51b in the side view. Therefore, on the side of the inclination change point 51b of the vertical surface 51a, raindrops can be made to efficiently flow rearwardly. On the side of the side inclination change point 53c, raindrops come to horizontally flow to come to readily flow rearwardly and then laterally flow along the overhang surface 54a of the step part 54. Thus, the raindrops can be made to smoothly flow and splashes of the raindrops on the rider can be suppressed.

Furthermore, the mirror-side overhang surfaces 80b of the rearview mirrors 47 have shapes that always extend obliquely rearwardly from the parts attached to the front cowl 40 to the left and right sidewall parts 82 in the plan view. Therefore, raindrops can be made to smoothly flow obliquely rearward from the front cowl 40. This can suppress splashes of the raindrops on the rider.

In addition, the blinkers 79 are provided monolithically with the bodies 77 of the rearview mirrors 47 and the blinker lenses 85 of the blinkers 79 are disposed in the mirror-side overhang surfaces 80b. This can prevent light of the blinker 79 from directly reaching the eyes of the rider.

Moreover, the headlight 49 has the lamps 57, which are disposed so as to be separated into the left and right sides, and the lens surface 63 covering the lamps 57. The center part between the left and right lamps 57 is formed so as to be vertically narrower than the parts where the lamps 57 are disposed, and only the lens surface 63 is laterally continuous. Thus, it is hard for heat by the lamps 57 to accumulate at the center part of the headlight 49, which can prevent the headlight 49 from being affected by the heat. Furthermore, because the lens surface 63 is laterally continuous across the center part and is monolithic, the step part 54 can be easily formed at the part of the front cowl 40 near the horizontal upper edge part 66a at the center of the lens surface 63.

The above-described embodiment shows one aspect to which the present invention is applied and the present invention is not limited to the above-described embodiment.

In the above-described embodiment, it is explained that the side inclination change point 53c is set at a position more to the rear than the inclination change point 51b in side view. However, the present invention is not limited thereto and the side inclination change point 53c may be set at a position substantially corresponding with that of the inclination change point 51b in the side view.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body front structure of a saddle vehicle, comprising:
   a headlight in a front surface; and
   a front cowl to which rearview mirrors are attached on left and right sides of an upper part of the front cowl;
   a lens surface of the headlight and the upper part of the front cowl each having a surface that is inclined so as to extend upwardly and rearwardly and forming a front cowl surface continuously covering a vehicle body front surface in combination;
   wherein a step part is provided at a connection part between the front cowl and an upper edge of the lens surface of the headlight;
   the step part inclined outwardly and rearwardly in a vehicle width direction to base parts of the rearview mirrors along the upper edge of the lens surface; and
   inclined surfaces continuously leading to the step part are made in the lower surfaces of the rearview mirrors whereby the inclination of the step part substantially corresponds to the inclination of the lower surfaces of the rearview mirror.

2. The vehicle body front structure of a saddle vehicle according to claim 1, wherein the upper edge of the headlight is low at a center and rises obliquely upwardly toward lateral sides.

3. The vehicle body front structure of a saddle vehicle according to claim 1, wherein:
the rearview mirrors have monolithic shapes that are smoothly continuous from the front cowl to bodies of the rearview mirrors; and
an angle of mirror surfaces is allowed to be independently adjusted.

4. The vehicle body front structure of a saddle vehicle according to claim 2, wherein:
the rearview mirrors have monolithic shapes that are smoothly continuous from the front cowl to bodies of the rearview mirrors; and
an angle of mirror surfaces is allowed to be independently adjusted.

5. The vehicle body front structure of a saddle vehicle according to claim 1, wherein:
the front cowl has an inclination change point at which a change of shape of a top surface toward a horizontal plane from a substantially vertical front end surface is made in a side view;
the front cowl has side inclination change points from which the step part extends with change in orientation to lateral directions from side edge parts of the front end surface in front view; and
the inclination change point and the side inclination change points are set at positions substantially corresponding with each other in a side view or the side inclination change points are set at positions more in a rearward direction than the inclination change point in a side view.

6. The vehicle body front structure of a saddle vehicle according to claim 2, wherein:
the front cowl has an inclination change point at which a change of shape of a top surface toward a horizontal plane from a substantially vertical front end surface is made in a side view;
the front cowl has side inclination change points from which the step part extends with change in orientation to lateral directions from side edge parts of the front end surface in front view; and
the inclination change point and the side inclination change points are set at positions substantially corresponding with each other in a side view or the side inclination change points are set at positions more in a rearward direction than the inclination change point in a side view.

7. The vehicle body front structure of a saddle vehicle according to claim 3, wherein:
the front cowl has an inclination change point at which a change of shape of a top surface toward a horizontal plane from a substantially vertical front end surface is made in a side view;
the front cowl has side inclination change points from which the step part extends with change in orientation to lateral directions from side edge parts of the front end surface in front view; and
the inclination change point and the side inclination change points are set at positions substantially corresponding with each other in a side view or the side inclination change points are set at positions more in a rearward direction than the inclination change point in a side view.

8. The vehicle body front structure of a saddle vehicle according to claim 1, wherein:
blinkers are provided monolithically with the bodies of the rearview mirrors and lenses of the blinkers are disposed in the inclined surfaces as the lower surfaces of the rearview mirrors.

9. The vehicle body front structure of a saddle vehicle according to claim 2, wherein:
blinkers are provided monolithically with the bodies of the rearview mirrors and lenses of the blinkers are disposed in the inclined surfaces as the lower surfaces of the rearview mirrors.

10. The vehicle body front structure of a saddle vehicle according to claim 1, wherein:
the headlight has lamps that are disposed so as to be separated into left and right sides and the lens surface covering the lamps, and
a center part of the headlight between the lamps on the left and right sides is formed so as to be vertically narrower than parts where the lamps are disposed, and only the lens surface is laterally continuous.

11. The vehicle body front structure of a saddle vehicle according to claim 2, wherein:
the headlight has lamps that are disposed so as to be separated into left and right sides and the lens surface covering the lamps, and
a center part of the headlight between the lamps on the left and right sides is formed so as to be vertically narrower than parts where the lamps are disposed, and only the lens surface is laterally continuous.

12. A vehicle body front structure of a saddle vehicle, comprising:
a front cowl including left and right sides of an upper part of the front cowl;
a headlight having a lens surface;
said lens surface of the headlight and the upper part of the front cowl each having a surface that is inclined and extending upwardly and rearwardly and forming a front cowl surface continuously covering a vehicle body front surface;
a step part is provided at a connection part between the front cowl and an upper edge of the lens surface of the headlight;
said step part extending outwardly in a vehicle width direction to base parts of the rearview mirrors along the upper edge of the lens surface; and
inclined surfaces continuously leading to the step part are formed in a left rearview mirror operatively connected to the left side of the upper part of the front cowl and a right rearview mirror operatively connected to the right side of the upper part of the front cowl,
said inclined surfaces being in the lower surfaces of the rearview mirrors, whereby the lower inclined surfaces of the rearview mirrors have a width which is greater than the width of the step part of the front cowl, in a vehicle height direction, whereby the raindrop is from the headlight lens reaches the end points of the rearview mirrors.

13. The vehicle body front structure of a saddle vehicle according to claim 12, wherein the upper edge of the headlight is low at a center and rises obliquely upwardly toward lateral sides.

14. The vehicle body front structure of a saddle vehicle according to claim 12, wherein:
the rearview mirrors have monolithic shapes that are smoothly continuous from the front cowl to bodies of the rearview mirrors; and an angle of mirror surfaces is allowed to be independently adjusted.

15. The vehicle body front structure of a saddle vehicle according to claim 12, wherein:
the front cowl has an inclination change point at which a change of shape of a top surface toward a horizontal plane from a substantially vertical front end surface is made in a side view;
the front cowl has side inclination change points from which the step part extends with change in orientation to lateral directions from side edge parts of the front end surface in front view; and
the inclination change point and the side inclination change points are set at positions substantially corresponding with each other in a side view or the side inclination change points are set at positions more in a rearward direction than the inclination change point in a side view.

16. The vehicle body front structure of a saddle vehicle of claim 1, wherein the lower inclined surfaces of the rearview mirrors have a width which is greater than the width of the step part of the front cowl, in a vehicle height direction, whereby the raindrops from the headlight lens reaches the end points of the rearview mirrors.

17. A vehicle body front structure for a saddle vehicle which comprises:
a front surface,
a headlight containing a lens surface and provided in the front surface,
a front cowl disposed above the lens surface and provided with rearview mirrors attached to the left and right sides of the upper part thereof and inclined in a rearward direction, the lens surface and the upper part of the front cowl each having a surface which was inclined to extend upward and rearward to form, in combination, a front surface which continuously covers a vehicle body front surface,
a step part provided in the front cowl at a location between the front cowl and an upper edge of the lens surface of the headlight, the step part extending outwardly in a vehicle width direction and rearwardly along the upper edge of the lens surface to a lower surface of the rearview mirrors, so that the inclination of the step part is contiguous with and substantially corresponds to the inclination of the lower surface of the rearview mirrors,
whereby a suppression of splashes of raindrops on the rider from the front cowl and a reduction in the susceptibility to a crosswind in the vehicle body front structure is achieved.

* * * * *